United States Patent [19]

Sasakawa et al.

[11] Patent Number: 5,592,720
[45] Date of Patent: Jan. 14, 1997

[54] MOUNTING CLIP

[75] Inventors: Hidetoshi Sasakawa, Hokkaido; Keiji Ushiyama, Shizuoka, both of Japan

[73] Assignee: Yazaki Corporation, Tokyo, Japan

[21] Appl. No.: 568,417

[22] Filed: Dec. 6, 1995

[30] Foreign Application Priority Data

Dec. 6, 1994 [JP] Japan .................................. 6-302327

[51] Int. Cl.⁶ .............................. A44B 17/00; F16B 29/00
[52] U.S. Cl. .................................. 24/453; 24/293; 24/297
[58] Field of Search ........................... 24/453, 41.1, 292,
24/293, 297; 411/508, 509, 913, 552, 182

[56] References Cited

U.S. PATENT DOCUMENTS

| | | | |
|---|---|---|---|
| 2,188,026 | 1/1940 | Wiley | 24/293 |
| 2,201,335 | 5/1940 | Cotter | 24/293 |
| 2,515,827 | 7/1950 | Howard | 24/453 |
| 4,422,222 | 12/1983 | Notoya | 24/453 |
| 4,762,437 | 8/1988 | Mitomi | 24/297 |
| 4,927,306 | 5/1990 | Sato | 411/913 |

FOREIGN PATENT DOCUMENTS

| | | | |
|---|---|---|---|
| 0524892 | 5/1956 | Canada | 24/453 |
| 50-88758 | 7/1975 | Japan . | |
| 57-64194 | 4/1982 | Japan . | |

Primary Examiner—Victor N. Sakran
Attorney, Agent, or Firm—Morgan, Lewis and Bockius LLP

[57] ABSTRACT

A clip not only has a substantially cylindrical clip main body arranged on a side surface of a base plate so as to be integral with the base board, but also has a pair of flexible blades arranged in tonguelike form so as to be sloped upward toward the clip main body at positions close to the clip main body with the base plate as the basal ends of such flexible blades. Further, a pair of retaining protuberances having flexibility are formed on a circumferential wall surface of the clip main body so as to be integral with the clip main body. The flexible blades are disposed so as to be substantially 90° shifted from positions at which the retaining protuberances are formed. Still further, notches are formed so as to accommodate the front ends of the pair of flexible blades at positions confronting the pair of flexible blades on the circumferential wall surface of the clip main body.

7 Claims, 3 Drawing Sheets

MOUNTING CLIP

BACKGROUND OF THE INVENTION

1. Field of the invention

The invention relates to clips adapted for fixing wire harnesses to mounting plates such as chassis or wiring boards of, e.g., automobile bodies or various electronic devices. More particularly, the invention is directed to a clip for stably fixing a wire harness irrespective of the thickness and width of the mounting body.

2. Related art

Generally, when a wire harness is assembled to the body of an automobile or the like, clips made of resin are mounted on the wire harness at predetermined intervals by tape or the like, and the wire harness is fixed to the body through these clips. Such clips come in various types. An exemplary clip will be described with reference to FIGS. 6 and 7.

As shown in FIG. 6, a clip 1 has not only a substantially cylindrical clip main body 3 on a surface of a base plate 2, but also has a pair of flexible blades 4a, 4b having such a shape as to expand outward from the vicinity of the clip main body 3. Further, a pair of retaining protuberances 5a, 5b having flexibility are arranged on the circumferential surface of the clip main body 3. It may be noted that a wire harness 6 is fixed by an adhesive vinyl tape or the like after being brought into contact with the base plate 2 so as to extend along the lower surface of the base plate 2.

Further, a mounting hole 8 for allowing the clip main body 3 to be inserted thereinto is formed in a mounting plate 7 to which the wire harness is fixed. In attaching the wire harness 6 to the mounting plate 7, the wire harness 6 is first fixed to the base plate 2 by the tape or the like, and then the clip main body 3 is squeezed into the mounting hole 8. While the clip main body 3 is being inserted into the mounting hole 8, the pair of retaining protuberances 5a, 5b are biased by the inner wall of the mounting hole 8 so as to be deformed by flexing toward the center of the clip main body 3.

Then, as shown in FIG. 7, the pair of retaining protuberances 5a, 5b recover the original shape thereof when the inserting of the pair of retaining protuberances 5a, 5b has been completed, making the clip main body 3 unrelesable from the mounting hole 8. Hence, the wire harness 6 can be fixed to the mounting plate 7 through the clip 1.

If the mounting plate 7 is wide as indicated by the phantom line, then the lower surface of the mounting plate 7 is pushed down while brought into contact with the flexible blades 4a, 4b when the pair of retaining protuberances 5a, 5b have been completely inserted into the mounting hole 8. Therefore, once the pair of retaining protuberances 5a, 5b have recovered the original shape thereof, the mounting plate 7 is made unrelesable by the pair of retaining protuberances 5a, 5b. In addition, the flexible blades 4a, 4b are resiliently urged upward, which in turn prevents the clip from being slackened.

However, the flexible blades 4a, 4b of the thus constructed clip have not been able to function, in some cases, because of the shape of the mounting plate 7. For example, as shown in FIG. 7, in the case where the width W of the mounting plate 7 is narrow and therefore the mounting plate 7 does not come in contact with the flexible blades 4a, 4b when the pair of retaining protuberances 5a, 5b have been completely inserted into the mounting hole 8, a gap is produced between the pair of retaining protuberances 5a, 5b and the mounting plate 7. As a result, the clip 1 is slackened with respect to the mounting plate 7 despite the fact that the flexible blades 4a, 4b are provided in order to prevent the slackening of the clip 1.

As is apparent from the above description, in the conventional clip 1, the flexible blades 4a, 4b have not been able to perform, in some cases, such a given function as to prevent the slackening of the clip 1, depending on the shape of the mounting plate 7. When the clip 1 is slackened, the clip 1 makes unwanted noise and vibrations, e.g., during the travelling of the automobile. Further, the flexible blades 4a, 4b have the outward by extending shape, which has made the flexible blades 4a, 4b susceptible to interference with the other parts of the clip. As a result, the flexible blades 4a, 4b are susceptible to breakage during shipment, which is one of many problems encountered by the conventional clip 1.

SUMMARY OF THE INVENTION

The invention has been made in view of the aforementioned problems. The object of the invention is, therefore, to provide a clip which can be fixed stably independently of the shape of the mounting plate and which can reliably prevent breakage or the like during shipment.

The above object of the invention can be achieved by a clip that includes: a platelike base plate; a clip main body projected on the base plate and being inserted into a mounting hole formed in a mounting plate; and a pair of retaining protuberances being mounted on a circumferential wall surface of the clip main body and having flexibility. In such clip, a pair of flexible blades are arranged, the pair of flexible blades being sloped toward the clip main body from the base plate.

Further, the above object of the invention can be achieved by the clip in which notches for accommodating front ends of the flexible blades are arranged in the circumferential wall surface of the clip main body.

Still further, the above object of the invention can be achieved by the clip in which the flexible blades are arranged on the base plate so as to be substantially 90° shifted from the positions at which the retaining protuberances on the circumferential wall surface of the clip main body are formed, The clip of the invention is characterized as arranging a pair of flexible blades that are sloped toward the clip main body from the base plate.

As a result of this construction, under the condition that the clip main body is inserted into the mounting hole to be retained by the pair of retaining protuberances, the mounting plate is biased by the pair of retaining protuberances and the pair of flexible blades, which in turn reliably prevents the slackening of the clip. In addition, the flexible blades are arranged on the base plate so as to be sloped toward the clip main body. Therefore, the urging force derived from the flexible blades is exerted to the vicinity of the mounting hole, which in turn allows a member on which the clip main body is mounted to be small. For example, the clip can be mounted on a narrow mounting plate.

Further, the notches for accommodating the front ends of the flexible blades are arranged on the circumferential wall surface of the clip main body. Therefore, the urging force derived from the flexible blades is exerted to the opening edge of the mounting hole, which in turn allows the clip to be mounted to a smaller member.

Still further, the flexible blades are arranged on the base plate so as to be substantially 90° shifted from the positions at which the retaining protuberances on the circumferential wall surface of the clip main body are formed. Therefore, the urging force to be exerted to both sides of the mounting plate can be distributed uniformly, which in turn allows a more rigid mounting structure to be obtained and hence reliably prevents the slackening or the like of the clip.

DETAILED DESCRIPTION OF THE PREFERRED EMBODIMENTS

Figure 1:
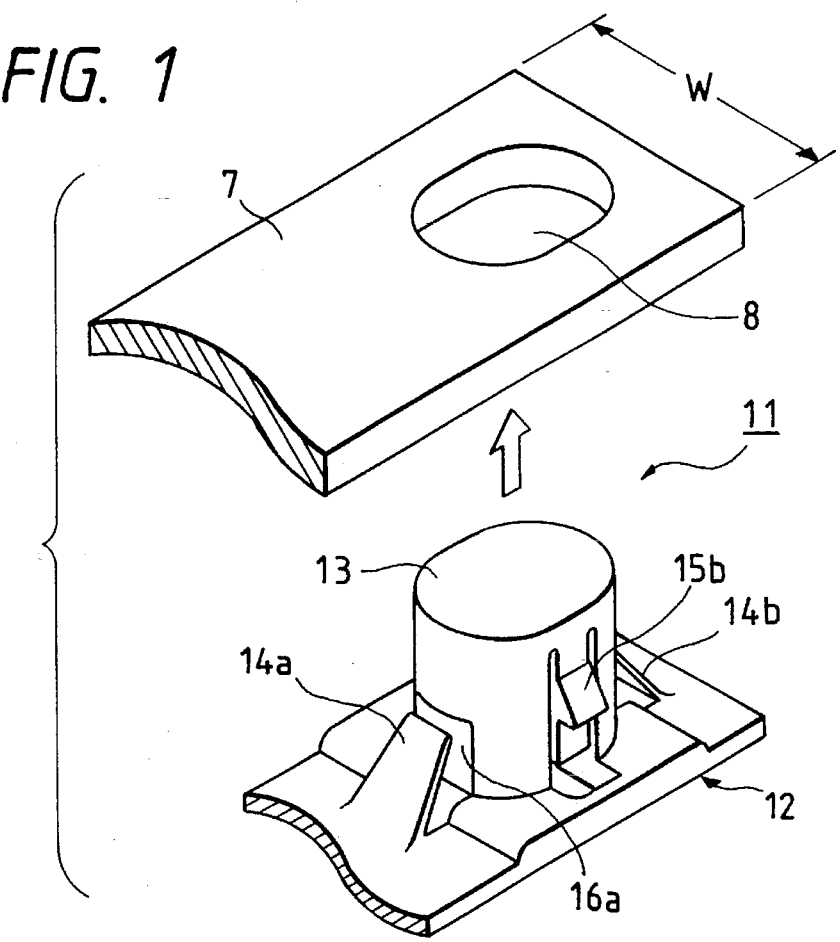
FIG. 1 is a perspective view showing a clip, which is an embodiment of the invention.
Figure 2:
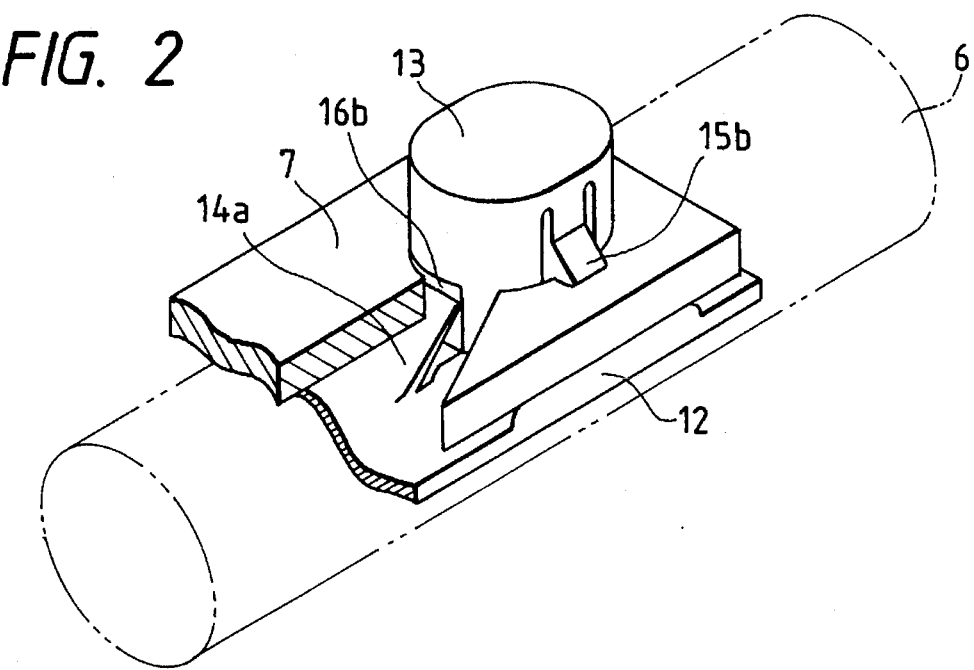
FIG. 2 is a perspective view showing the clip fixed to a mounting plate.
Figure 3:
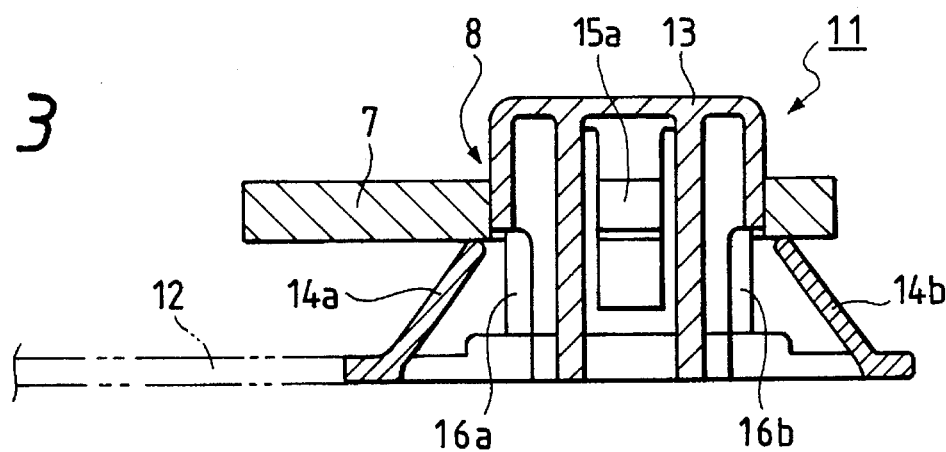
FIG. 3 is a sectional view showing how the clip is fixed to the mounting plate.
Figure 4:
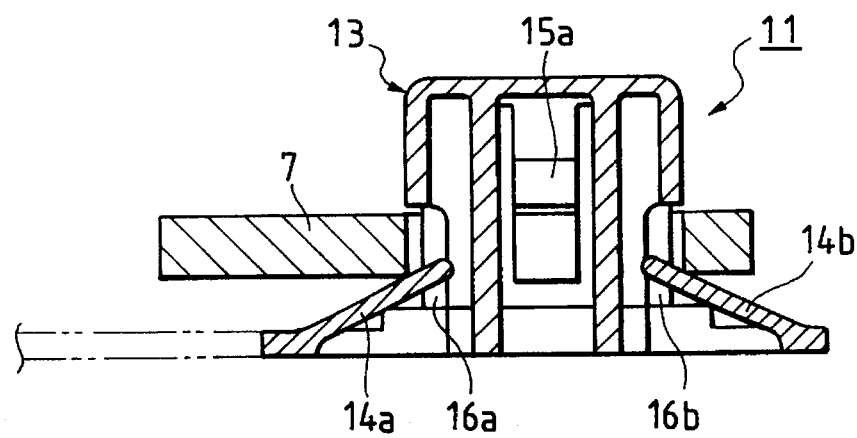
FIG. 4 is a sectional view of FIG. 2.
Figure 5:
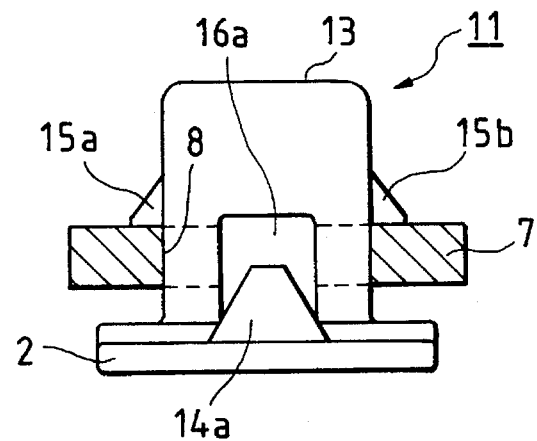
FIG. 5 is a side view of FIG. 2.
Figure 6:
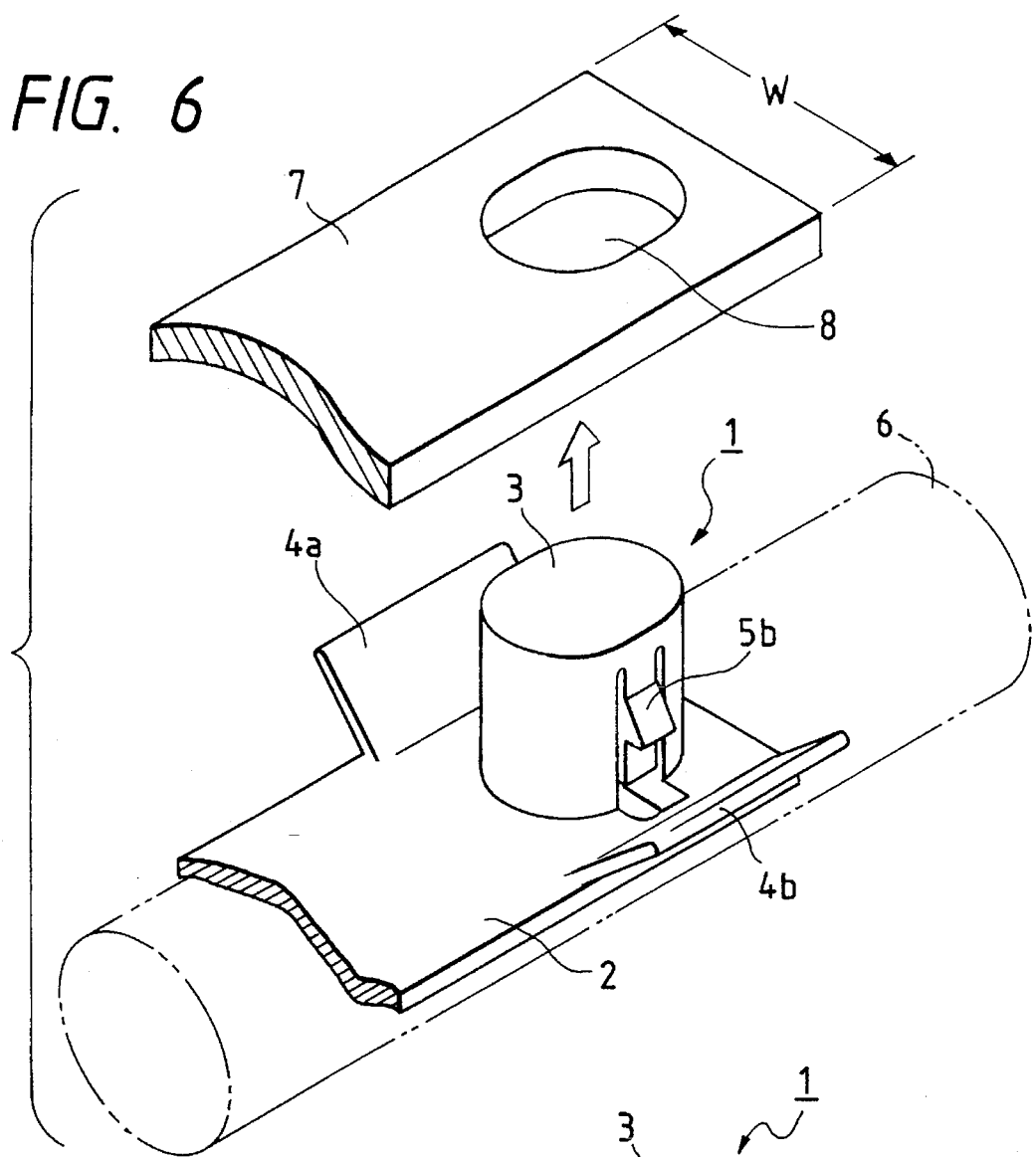
FIG. 6 is a perspective view showing the construction of a conventional clip.
Figure 7:
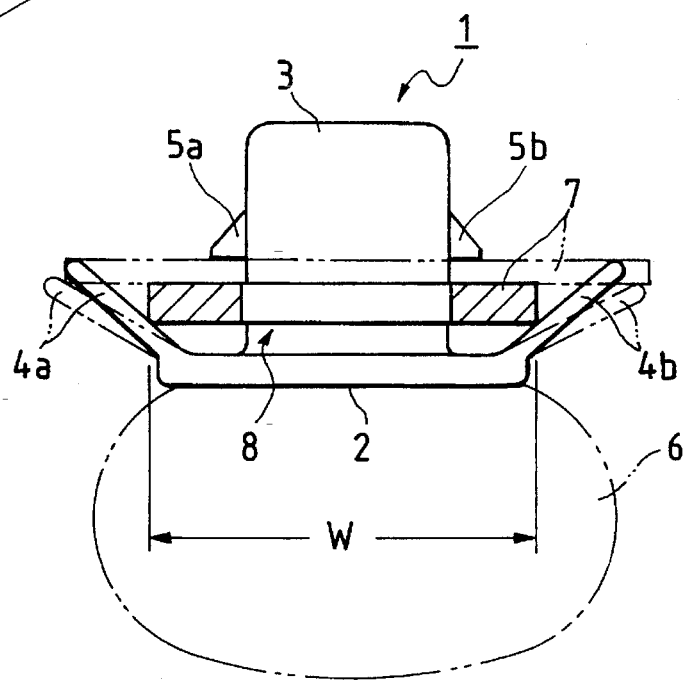
FIG. 7 is a sectional view showing the main portion of a condition in which the clip of FIG. 6 is fixed.

A clip, which is an embodiment of the invention, will now be described with reference to FIGS. 1 to 5. FIG. 1 is a perspective view showing a clip, which is an embodiment of the invention; FIG. 2 is a perspective view showing the clip fixed to a mounting plate; and FIGS. 3 to 5 are sectional views showing main portions of the fixed conditions. How the clip of the invention is constructed will be described first, and how the clip is fixed will be described next.

As shown in FIG. 1, a clip 11 not only has a substantially cylindrical clip main body 13 arranged on a side surface of a base plate 12 so as to be integral with the base plate 12, but also has a pair of flexible blades 14a, 14b arranged in tonguelike form so as to be sloped upward toward the clip main body 13 at positions close to the clip main body 13 with the base plate 12 as the basal ends of such flexible blades. Further, a pair of retaining protuberances 15a, 15b having flexibility are arranged on a circumferential surface of the clip main body 13 so as to be integral with the clip main body 13. These flexible blades 14a, 14b are disposed so as to be substantially 90° shifted from the positions at which the retaining protuberances 15a, 15b are formed.

That is, the pair of flexible blades 14a, 14b are related in terms of position to the pair of retaining protuberances 15a, 15b in such a manner that all these members depict a cross with the clip main body 13 as the center or, in other words, that a line connecting the pair of flexible blades 14a, 14b orthogonally intersects a line connecting the pair of retaining protuberances 15a, 15b with the clip main body 13 as the center. It may be noted that a wire hardness is fixed to the base plate 12 by an adhesive vinyl tape or the like so as to extend along the lower side surface of the base plate 12.

Further, as shown in FIG. 3, the pair of flexible blades 14a, 14b are symmetrical with the clip main body 13 with each blade leaning on the clip main body and with the basal portion of each blade being formed integrally with the base plate 12. In addition, a pair of notches 16a, 16b for accommodating the front ends of the pair of flexible blades 14a, 14b are formed in circumferential wall surface portions of the clip main body 13, the circumferential wall surface portions confronting the flexible blades 14a, 14b when the pair of flexible blades 14a, 14b are flexibly displaced.

How the clip 11 is fixed will be described next. First, as shown in FIG. 2, the wire harness 6 is fixed to the base plate 12 by an adhesive tape prior to fixing the clip 11. Then, the front end of the clip main body 13 is inserted and squeezed into a mounting hole 8 formed in a mounting plate 7. At this instance, the pair of retaining protuberances 15a, 15b are displaced toward the center of the clip main body 13 while biased by the inner circumferential surface of the mounting hole 8, allowing the clip main body 13 to be inserted into the mounting hole 8 smoothly.

When the squeezing operation is continued as shown in FIG. 3, the lower surface of the mounting plate 7 comes in contact with the front ends of the pair of flexible blades 14a, 14b.

Then, when the clip main body 13 is still further squeezed under the condition shown in FIG. 3, the front ends of the pair of flexible blades 14a, 14b enter into the pair of notches 16a, 16b and are therefore flexed downward as shown in FIGS. 4 and 5. When the pair of retaining protuberances 15a, 15b slip through the mounting hole 8 to the upper surface of the mounting plate 7, the retaining protuberances 15a, 15b recover the original shape thereof and hence retained by the mounting hole 8, so that the clip 11 is unreleasably fixed.

Emphasis must be placed at this instance on that fact that the pair of flexible blades 14a, 14b are upwardly sloped toward the clip main body 13. As a result of this construction, under the condition that the clip main body 13 is inserted into the mounting hole 8 to be retained by the pair of retaining protuberances 15a, 15b, the slackening of the clip can be prevented reliably by causing the upper surface of the mounting plate 7 to be retained by the pair of retaining protuberances 15a, 15b and causing the lower surface of the mounting plate 7 to be urged by the pair of flexible blades 14a, 14b. In addition, urging force derived from the pair of flexible blades 14a, 14b is exerted to the vicinity of the mounting hole 8, which in turn allows a narrow mounting plate or small mounting member to be fixed.

Further, since the notches 16a, 16b for accommodating the front ends of the pair of flexible blades 14a, 14b are arranged on the circumferential wall surface of the clip main body 13, the urging force derived from the flexible blades 14a, 14b is exerted to the opening edge of the mounting hole 8, allowing a smaller mounting member to be fixed. Still further, since the flexible blades 14a, 14b have such a shape as not to extend outward, not only the clip 11 can be made compact in structure as a whole, but also breakage during shipment can be prevented.

Still further, the pair of flexible blades 14a, 14b are arranged on the base plate 12 so as to be substantially 90° shifted from the positions at which the pair of retaining protuberances 15a, 15b on the side circumferential surface of the clip main body 13 are formed. Therefore, the urging force to be exerted to both sides of the mounting plate 7 can be distributed uniformly, which in turn allows rigid mounting structure to be obtained and hence reliably prevents the slackening of the clip in the vertical as well as horizontal directions.

As described above, the clip of the invention is characterized as arranging the pair of flexible blades that are sloped toward the flip main body from the base plate.

As a result of this construction, under the condition that the clip main body has been inserted into the mounting hole to be retained by the pair of retaining protuberances, not only the slackening of the clip can be reliably prevented by causing the mounting plate to be biased by the pair of retaining protuberances and the pair of flexible blades, but also the downsizing of the clip as a whole and breakage thereof during shipment can be prevented reliably.

In addition, the urging force derived from the flexible blades is exerted to the vicinity of the mounting hole, and this allows a narrow mounting plate or small mounting plate to be fixed. As a result, a more general-purpose clip whose use is not limited to the shape and the like of the mounting plate can be obtained.

Still further, the notches for accommodating the front ends of the flexible blades are arranged on the circumferential wall surface of the clip main body, the urging force derived from the flexible blades is exerted to the opening edge of the mounting hole, which in turn contributes to improving the adaptability of the clip to the mounting plate.

Still further, the flexible blades are arranged on the base plate so as to be substantially 90° shifted from the positions at which the retaining protuberances on the circumferential wall surface of the clip main body are formed. Therefore, the urging force to be exerted to both sides of the mounting plate can be distributed uniformly, which in turn reliably prevents the slackening and the like of the clip in both the vertical as well as horizontal directions.

What is claimed is:

1. A clip for mounting to a mounting plate, the clip comprising:

a base plate;

a clip main body disposed on the base plate, the clip main body to be inserted into a mounting hole of the mounting plate;

a pair of retaining protuberances being mounted on a circumferential wall surface of the clip main body, the retaining protuberances being flexible; and a pair of flexible blades disposed on the base plate the flexible blades being inwardly sloped toward the clip main body from the base plate, wherein a line connecting the pair of flexible blades orthogonally intersects a line connecting the pair of retaining protuberances, and wherein the clip main body is disposed at the intersection.

2. A clip according to claim 1, wherein the flexible blades are arranged on the base plate so as to be substantially 90° shifted from positions at which the retaining protuberances on the circumferential wall surface of the clip main body are formed.

3. A clip according to claim 1, wherein the flexible blades are sloped substantially toward the center of the clip main body from the base plate.

4. A clip for mounting to a mounting plate, the clip comprising:

a base plate:

a clip main body projected on the base plate, the clip main body to be inserted into a mounting hole of a mounting plate:

a pair of retaining protuberances being mounted on a circumferential wall surface of the clip main body, the retaining protuberances being flexible; and a pair of flexible blades sloped toward the clip main body from the base plate, wherein notches for accommodating front ends of the flexible blades are arranged in the circumferential wall surface of the clip main body.

5. A clip according to claim 4, wherein the flexible blades are arranged on the base plate so as to be substantially 90° shifted from positions at which the retaining protuberances on the circumferential wall surface of the clip main body are formed.

6. A clip according to claim 2, wherein the flexible blades are sloped substantially toward the center of the clip main body from the base plate.

7. A clip according to claim 2, wherein a line connecting the pair of flexible blades orthogonally intersects a line connecting the pair of retaining protuberances and wherein the clip main body is disposed at the intersection.

* * * * *